June 6, 1944.   R. S. GAUGLER   2,350,348

HEAT TRANSFER DEVICE

Filed Dec. 21, 1942

INVENTOR.
Richard S. Gaugler
BY Spencer Hardman and Lehr
attorneys

Patented June 6, 1944

2,350,348

UNITED STATES PATENT OFFICE 2,350,348

HEAT TRANSFER DEVICE

Richard S. Gaugler, Dayton, Ohio, assignor to General Motors Corporation, Dayton, Ohio, a corporation of Delaware Application December 21, 1942, Serial No. 469,649

12 Claims. (Cl. 62—125)

My invention relates to the art of transferring heat and particularly to a method of and apparatus for transferring heat from one point to another.

In the art of transferring heat from one point to another, it is common practice to use a closed system partially filled with a volatile liquid wherein heat is absorbed at one point by the evaporation of the volatile liquid and wherein heat is dissipated or given off at another point by the condensation of the vapor to a liquid. In such systems, as far as I am aware, the evaporation of the liquid or, in other words, the absorption of heat always takes place at an elevation below the point where condensation, or in other words the giving off of heat, takes place, unless some additional work is expended on the liquid to lift it as a liquid to an elevation above the point where condensation takes place.

It is the principal object of my invention to cause an absorption of heat, or in other words, the evaporation of the liquid to a point above the place where the condensation or the giving off of heat takes place without expending upon the liquid any additional work to lift the liquid to an elevation above the point at which condensation takes place.

In accomplishing the aforesaid principal object of my invention, other more specific objects will be attained and these more specific objects will be apparent from the following description taken with the drawing, wherein.

Figure 1:
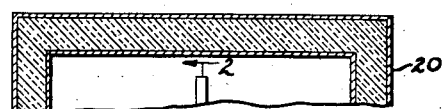
Fig. 1 is a sectional view of a novel form of refrigerator embodying one application of my method and apparatus for transferring heat.

For the purpose of illustrating one way in which my invention may be used, I have shown my novel method and apparatus for transferring heat as applied to the cooling of the interior of a refrigerator. For instance, in Fig. 1, the reference numeral 20 diagrammatically illustrates an insulated refrigerator containing the compartment 22 which is to be maintained at a low temperature. Removably attached to the underside of the refrigerator by means of the wing nuts 27 is a pan 26 containing cracked ice. Through the lower wall of the refrigerator extends the tube 24 hereinafter more fully described.

Figure 3:
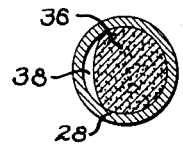
Fig. 3 is an enlarged sectional view taken along the lines 3—3 of Fig. 2.
Figure 2:
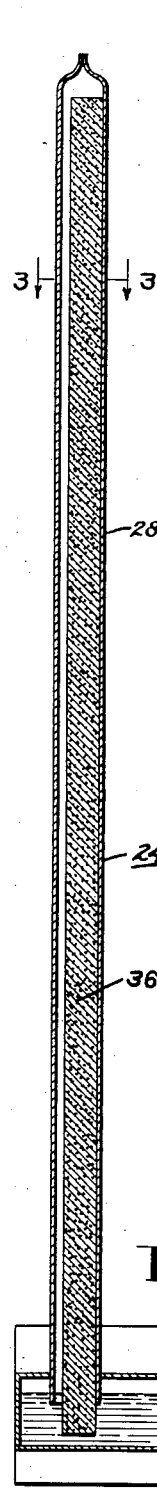
Fig. 2 is an enlarged sectional view taken along the lines 2—2 of Fig. 1.

The sealed tube 24 comprising the means for transferring heat from the insulated compartment 22 to the cracked ice within the container 26 is disclosed in some detail in Figs. 2, 3, 4, and 5. As shown in Figs. 2 and 3, one embodiment of this device comprises a vertical tube 28 pinched shut at its upper end and at its lower end opening into a short horizontal tube 30 which is likewise in the form of a sealed container. The horizontal tube 30 is provided with a fin 32 to increase its area of contact with the cracked ice and water in the pan 26. The horizontal tube 30 is partially filled with a volatile liquid 34. All other gases and liquids as far as possible are removed from the container formed by the tubes 28 and 30. The presence of other gases and liquids will not render the device inoperative but will raise the temperature differential. It is desirable that the liquid chosen for this purpose have a high latent heat of evaporation, a low density and low molecular weight, together with a high surface tension. Substantially any volatile liquid will work to some extent. Some examples of such liquids are anhydrous ammonia, water, and ethyl and methyl alcohol.

The heat transfer device 24 as so far described, would not operate to cool efficiently the interior of the compartment 22. There would only be a comparatively slight transfer of heat from the compartment 22 to the cracked ice and water in the pan 26 by means of direct thermal conduction through the metal walls of the tube 28. The liquid 34 will naturally collect at the lowest part of the container. The vapor within the sealed tube 24 will tend to condense in the coldest portion thereof which will naturally be the portion immersed in the cracked ice and water in the pan 26. Heretofore it has been necessary to use forced circulation or to arrange such a heat transfer device so that the coldest portion is at the top and the warm portion below, so that the liquid will collect in the warm portion and evaporate and the vapor will condense on the colder upper portions. Such an arrangement with the coldest portion at the top is very inconvenient for some purposes and cannot be used where the source of heat is at a level above the source of cold.

I, however, have found a very simple way to make such a heat transfer device operate no matter what is the relationship in elevation between the source of heat and the source of cold. To do this, I provide a means which will carry the liquid upwardly or in any direction without any forced circulation and without any moving parts. This means is in the form of a capillary structure 36 which extends from beneath the surface of the volatile liquid 34 up through the tube 28 substantially to its top or as far as is desirable to carry the cooling effect.

I have found that many capillary means may be used for this purpose. The choice of the capillary means depends upon the liquid and the vertical height to which the liquid is to be raised. For example, with a liquid such as anhydrous ammonia there may be used a continuous porous capillary structure of sintered powdered iron. Such a capillary structure may be formed by mixing non-compacted iron powder with ferrophosphorus powder to give a final or completed product containing 1.8% phosphorus. I prefer iron powder of substantially pure iron of such a size that all will pass through a 250 mesh screen and none will pass through a 325 mesh screen. To provide the capillary structure 36 the proper mixture of iron and ferro-phosphorus powder is placed in the tube 28 with a small spacer extending the full length of the tube and placed in a horizontal position, after which the spacer is withdrawn and the tube kept in a horizontal position while it is placed in a furnace. The furnace is preferably maintained at a temperature between 1950° and 2100° F. for periods ranging from about fifteen minutes to one hour. The tube preferably should be maintained under non-oxidizing conditions while it is heated and cooled. Where carbon-free iron powder cannot be obtained it is preferable to sinter under de-carbonizing conditions whereby the finished sintered material is substantially free from carbon. This sintering provides a porous homogeneous structure having great capillary attraction which is firmly bonded to the adjacent walls of the tube 28. After this is done, the tube 28 is joined by a seal joint to the tube 30 and the entire structure evacuated after which the volatile liquid is inserted and the upper end of the tube 28 is pinched off to seal the container. Sufficient volatile liquid should be inserted to fill the porous capillary structure and in addition provide a pool of sufficient depth in the tube 30 to contact the bottom of the capillary structure under all conditions. Prior to assembly, the lower end of the tube 28 may be cut off to expose the lower end of the capillary structure 36 so that it may protrude below the end of the tube 28 and project further into the liquid 34. However, this is not necessary and good results can be obtained without this.

Briquetted or compacted powdered metal with or without sintering may be used if desired but with a reduced volume of capillary flow due to the reduced porosity. Also, iron, cobalt, or nickel powder may be used with either iron, cobalt, or nickel phosphorus powder. In general, any continuous porous capillary structure will give results in accordance with its ability to provide a flow of liquid in any direction due to capillary action.

In operation, the volatile liquid 34, due to capillary action, will climb up through the porous capillary structure 36 to the upper part of the tube 28 where it will evaporate under the higher temperatures to which this portion of the tube 28 and the capillary structure 36 are subjected within the compartment 22. This evaporated volatile liquid will collect in the upper portion of the tube and by progressive accumulation there, will be forced down through the passage 38 provided at the side of the porous capillary structure 36 to the bottom of the tube 28 and escape through the liquid 34 to the space above the liquid 34 where it will condense upon the walls of the tube 30. Thus, by this principle, I transmit heat downwardly through evaporation and condensation and raise liquid upwardly without the expenditure of any work in raising the liquid.

Figure 4:
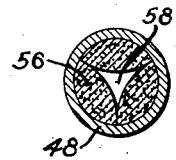
Fig. 4 is a sectional view similar to Fig. 3 illustrating a modified form of the invention.
Figure 5:
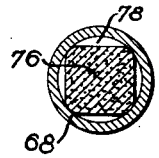
Fig. 5 is another cross-sectional view similar to Fig. 3 showing another form of the invention.

The construction shown in Fig. 4 may also be used in this heat transfer device. The tube 48 is provided with a capillary structure 56 formed in three parts enclosing a triangular passage 58. In this form, the sintered iron may be made in the form of a paste and lightly pressed against the walls of the tube and baked prior to the sintering process. Where it is desired that there be less conduction between the walls of the tube and the porous capillary structure, the form shown in Fig. 5 may be used. In this form, the capillary structure 76, in the form of a square rod with corners rounded as much as is desired to give the desired contact with the inside wall of the tube is sintered in a mold and then inserted into the tube 68 after the sintering process is completed. This construction separates the greater portion of the capillary structure 76 from the walls of the tube 68 by the four substantially identical passages 78 which are formed between the flat sides of the capillary structure and the inner walls of the tube 68. In each of these modifications shown in Figs. 4 and 5, the passages 58 and 78 correspond to the passage 38, while the capillary structures 56 and 76 correspond to the capillary structure 36, while the tubes 48 and 68 correspond to the tube 28.

Figure 6:
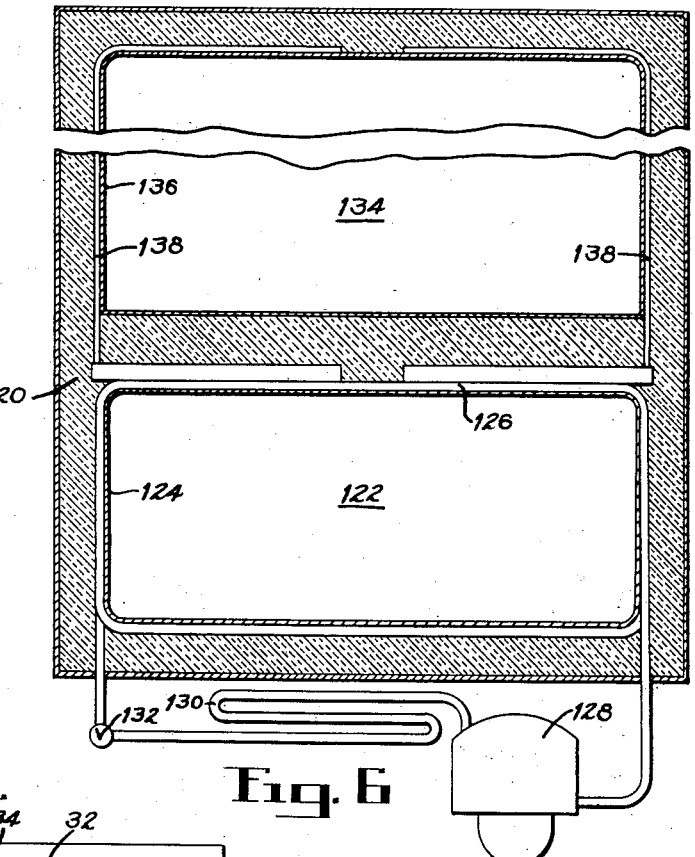
Fig. 6 is a sectional view of a two-compartment refrigerator embodying another application of my method and apparatus.

In Fig. 6, I have shown my invention applied to a two-compartment refrigerator 120 containing in the lower portion of the insulated cabinet a freezing compartment 122 enclosed by an inner liner 124 around which is wrapped tubing 126 constituting the primary evaporator of a primary refrigerating system which includes a sealed motor-compressor unit 128 for withdrawing evaporated refrigerant from the primary evaporator 126 and for forwarding the compressed refrigerant to a condenser 130, where the compressed refrigerant is liquefied and returned to the evaporator 126 under the control of a suitable expansion valve 132. This primary refrigerating circuit is shown diagrammatically for the purpose of illustration.

The insulated cabinet is also provided with an upper compartment 134 which is to be maintained at a temperature slightly above freezing, such as 35° or 40° F. Particularly it is desired that none of the atmosphere in this compartment contacts any surface below 32° F., and it is desired that the cooling of this compartment be accomplished with a minimum differential between the desired temperature of the atmosphere and the temperature of the refrigerating surfaces by which it is cooled.

To cool the walls of the inner liner 136 which encloses this upper compartment 134, I use a number of my improved heat transfer devices like that shown in Fig. 2, with the lower ends of the heat transfer devices elongated and resting in good thermal contact upon the primary evaporator 126 and their upper ends extending up over the sides and bent over the top of the inner liner 136 in good thermal contact therewith. These devices are designated by the reference character 138. By this arrangement, the volatile liquid in the bottom of each tube rises upwardly through the porous capillary structure and comes into heat exchange relation with the sides and top of the inner liner structure where it is heated and evaporates and is forced down through the passage in the tube to the bottom tube which rests on the primary evaporator, where it is condensed. This action takes place in each of the devices and as many of the devices as closely spaced as is necessary may be used to maintain the compartment 134 at the desired temperature. These heat transfer devices therefore provide a simple way in which the compartments of a refrigerator may be arranged for greater convenience and greater thermal efficiency by placing the warmer compartment, which is used most, at a convenient height directly above the colder compartment.

Thus, with the simple heat transfer device shown in Fig. 2, I am able to transfer heat downwardly or in any direction without any moving parts or forced circulation. It is evident that its use is not limited to refrigeration but that it may be used wherever it is desired to transfer heat at any desired temperatures for any desired purpose.

While the form of embodiment of the invention as herein disclosed, constitutes a preferred form, it is to be understood that other forms might be adopted, all coming within the scope of the claims which follow.

What is claimed is as follows:

1. The method of transferring heat from one point to another by means of a closed system wherein a volatile liquid is successively evaporated and condensed at substantially the same pressure which comprises evaporating the liquid refrigerant at one level, condensing the vapor at another level below the point at which evaporation takes place, and returning the liquid from the point of condensation to the point of evaporation by capillary action.

2. The method of transferring heat from a first point at a higher temperature to a second point at a lower temperature in any desired direction employing a sealed system containing a volatile liquid which comprises evaporating the volatile liquid at the first point at the higher temperature in the system, condensing the vapor from the volatile liquid at the second point at a lower temperature in the system, and returning by capillary action the condensed volatile liquid from the second point to the first point.

3. Refrigerating apparatus comprising a primary refrigerating means, a device to be cooled located above said primary refrigerating means, a sealed container having a first portion in heat exchange relationship with said primary refrigerating means and a second portion extending into heat exchange relation with said device to be cooled, said container containing a capillary means and a passage each extending continuously from said first to said second portion, said container also containing a volatile liquid in contact with said capillary means.

4. Heat transfer apparatus comprising a primary heat source, a device for receiving heat located below said primary heat source, a sealed container having a first portion for receiving heat from said primary heat source and a second portion for transferring heat to said device, said container containing a capillary means and a passage each extending continuously between said second and first portions, said container containing a volatile liquid in contact with said capillary means.

5. A heat transfer device comprising a sealed container means having two points exposed to two different temperatures, said container means containing a capillary means extending continuously from one of said points to the other and also containing a connecting passage extending between said points, the surface of the capillary means between said points being exposed to said passage, said container means being provided with a volatile liquid in contact with said capillary means, said capillary means being in the form of non-compacted sintered iron powder bonded to the walls of the container means.

6. A heat transfer device comprising a sealed container means having two points exposed to two different temperatures, said container means containing a capillary means extending continuously from one of said points to the other and also containing a connecting passage extending between said points, the surface of the capillary means between said points being exposed to said passage, said container means being provided with a volatile liquid in contact with said capillary means, said capillary means being in the form of non-compacted iron powder bonded together and to the walls of the container means by ferrophosphorus.

7. A secondary heat transfer device wherein a volatile liquid evaporates at a temperature equal to or greater than the temperature at which it condenses, comprising sealed container means having two different points exposed to two different temperatures and capillary means extending within the container means continuously from one of the points to the other, one of said means being provided with a passage connecting said points, said capillary means having its surface exposed to said passage adjacent said points, and said container means containing a volatile liquid in contact with said capillary means.

8. A secondary heat transfer device wherein a volatile liquid evaporates at a temperature equal to or greater than the temperature at which it condenses, comprising sealed container means having two different points exposed to two different temperatures and capillary means extending within the container means continuously from one of the points to the other, one of said means being provided with a passage connecting said points, said capillary means having its surface exposed to said passage adjacent said points, said container means containing a volatile liquid in contact with said capillary means, and said capillary means being in the form of a porous metal structure.

9. A secondary heat transfer device wherein a volatile liquid evaporates at a temperature equal to or greater than the temperature at which it condenses, comprising sealed container means having two points exposed to two different temperatures, said container means containing capillary means extending continuously from one of said points to the other and also containing a connecting passage extending between said points, the capillary means having a portion of its surface between said points exposed to said passage, and said container means being provided with a volatile liquid in contact with said capillary means.

10. A secondary heat transfer device wherein a volatile liquid evaporates at a temperature equal to or greater than the temperature at which it condenses, comprising sealed container means having two points exposed to two different temperatures, said container means containing capillary means extending continuously from one of said points to the other and also containing a connecting passage extending between said points, the capillary means having a portion of its surface between said points exposed to said passage, said container means being provided with a volatile liquid in contact with said capillary means, and said capillary means being in the form of a porous metal structure.

11. A secondary heat transfer device wherein a volatile liquid evaporates at a temperature equal to or greater than the temperature at which it condenses, comprising sealed container means having two points exposed to two different temperatures, said container means containing capillary means extending continuously from one of said points to the other and also containing a connecting passage extending between said points, the capillary means having a portion of its surface between said points exposed to said passage, said container means being provided with a volatile liquid in contact with said capillary means, and said capillary means being in the form of sintered metal.

12. A secondary heat transfer device wherein a volatile liquid evaporates at a temperature equal to or greater than the temperature at which it condenses, comprising sealed container means having two different points exposed to two different temperatures, said container means containing capillary means extending continuously from one of said points to the other and also containing a connecting passage extending between said points, the capillary means having its surface exposed to said passage at and between said points, and said container means containing a volatile liquid in contact with said capillary means at one of said points.

RICHARD S. GAUGLER.